US009829599B2

(12) United States Patent
Filippenko et al.

(10) Patent No.: US 9,829,599 B2
(45) Date of Patent: Nov. 28, 2017

(54) SENSOR AND METHOD FOR FOREIGN OBJECT DETECTION IN INDUCTION ELECTRIC CHARGER

(71) Applicant: SCHNEIDER ELECTRIC USA, INC., Palatine (IL)

(72) Inventors: Alexander Filippenko, Cary, NC (US); Mark Kocher, Raleigh, NC (US)

(73) Assignee: Schneider Electric USA, Inc., Andover, MA (US)

( * ) Notice: Subject to any disclaimer, the term of this patent is extended or adjusted under 35 U.S.C. 154(b) by 285 days.

(21) Appl. No.: 14/665,617

(22) Filed: Mar. 23, 2015

(65) Prior Publication Data

US 2016/0282500 A1    Sep. 29, 2016

(51) Int. Cl.
| | |
|---|---|
| *G01B 7/14* | (2006.01) |
| *G01V 3/10* | (2006.01) |
| *H01F 27/40* | (2006.01) |
| *H01F 38/14* | (2006.01) |
| *H02J 50/10* | (2016.01) |
| *H02J 50/60* | (2016.01) |
| *H02J 7/02* | (2016.01) |

(Continued)

(52) U.S. Cl.
CPC .......... *G01V 3/104* (2013.01); *H01F 27/402* (2013.01); *H01F 38/14* (2013.01); *H02J 50/10* (2016.02); *H02J 50/60* (2016.02); *G01D 1/00* (2013.01); *G01R 1/00* (2013.01); *G06F 2101/00* (2013.01); *H02J 7/025* (2013.01)

(58) Field of Classification Search
CPC ......... G01R 1/00; G06F 1/00; G06F 2101/00; G01D 1/00; G01J 1/00; H01F 1/00; H02J 1/00
See application file for complete search history.

(56) References Cited

U.S. PATENT DOCUMENTS 5,351,005 A * 9/1994 Rouse .................... G01R 17/10
                                                  324/207.21
5,573,090 A   11/1996 Ross
(Continued)

FOREIGN PATENT DOCUMENTS

| EP | 1882292 | 1/2008 |
|---|---|---|
| EP | 2317625 | 5/2011 |

(Continued)

*Primary Examiner* — Jermele M Hollington
*Assistant Examiner* — Temilade Rhodes-Vivour
(74) *Attorney, Agent, or Firm* — Locke Lord LLP

(57) ABSTRACT

The invention detects foreign objects FO near a primary coil 100 of an induction charger. A sensors 111 of a sensor array 110 output sensing signals in response to magnetically coupling the alternating magnetic field 103 produced by the primary coil. A controller 165 connected to each sensor 111 scans the sensing signals and determines whether there is a foreign object perturbing the magnetic field 103 near a sensor. The magnetic field has a spatial distribution that varies by location across the primary coil area. Each sensor has a magnetic field sensing sensitivity that is inversely proportional to the magnetic intensity of the magnetic field produced by the primary coil at a location of the sensor, to reduce the collective dynamic range of the signals, thereby contributing to maintaining a high accuracy in signal sampling. A reference sensor coil 155 compensates for magnetic field drift of the primary coil.

14 Claims, 15 Drawing Sheets

(51) Int. Cl.
  *G01D 1/00* (2006.01)
  *G01R 1/00* (2006.01)

(56) References Cited

U.S. PATENT DOCUMENTS

| | | | |
|---|---|---|---|
| 5,821,731 A | 10/1998 | Kuki | |
| 7,443,135 B2 | 10/2008 | Cho | |
| 8,307,967 B2 | 11/2012 | Patwardhan | |
| 8,360,216 B2 | 1/2013 | Meins et al. | |
| 2005/0178632 A1 | 8/2005 | Ross | |
| 2010/0181126 A1 | 7/2010 | Penrod | |
| 2010/0213934 A1* | 8/2010 | Wang | B82Y 25/00 324/252 |
| 2010/0219796 A1 | 9/2010 | Kallmyer | |
| 2010/0219823 A1* | 9/2010 | Gogolla | G01V 3/10 324/258 |
| 2010/0225271 A1* | 9/2010 | Oyobe | B60L 5/005 320/108 |
| 2011/0128015 A1 | 6/2011 | Dorairaj et al. | |
| 2011/0169488 A1 | 7/2011 | Mather | |
| 2012/0038317 A1 | 2/2012 | Miyamoto et al. | |
| 2012/0077537 A1 | 3/2012 | Muratov et al. | |
| 2012/0119699 A1 | 5/2012 | Carbunaru et al. | |
| 2012/0236903 A1 | 9/2012 | Rejman et al. | |
| 2012/0265381 A1 | 10/2012 | Lee | |
| 2012/0280655 A1 | 11/2012 | Schneider et al. | |
| 2012/0293116 A1 | 11/2012 | Tate, Jr. et al. | |
| 2013/0029595 A1 | 1/2013 | Widmer et al. | |
| 2013/0033227 A1 | 2/2013 | Gibbons, Jr. | |
| 2013/0038276 A1 | 2/2013 | Raedy | |
| 2013/0049683 A1 | 2/2013 | Farkas | |
| 2013/0069441 A1* | 3/2013 | Verghese | G01R 33/10 307/104 |
| 2013/0169062 A1 | 7/2013 | Maikawa et al. | |
| 2013/0193749 A1 | 8/2013 | Nakamura et al. | |
| 2014/0091757 A1 | 4/2014 | Proebstle et al. | |
| 2014/0232200 A1 | 8/2014 | Maekawa | |
| 2014/0292266 A1 | 10/2014 | Eger et al. | |
| 2014/0300351 A1* | 10/2014 | Hahl | G01V 3/107 324/259 |
| 2014/0340035 A1 | 11/2014 | Maekawa | |
| 2015/0048752 A1 | 2/2015 | Van Den et al. | |
| 2015/0091507 A1 | 4/2015 | Hyde et al. | |
| 2015/0200550 A1 | 7/2015 | Maekawa | |
| 2015/0224882 A1 | 8/2015 | Brill et al. | |
| 2015/0233988 A1 | 8/2015 | Katz et al. | |

FOREIGN PATENT DOCUMENTS

| | | |
|---|---|---|
| GB | 2471879 | 1/2011 |
| WO | WO2009081115 | 7/2009 |
| WO | WO2012084095 | 6/2012 |
| WO | WO2013103948 A2 | 7/2013 |
| WO | WO2014029439 | 2/2014 |
| WO | WO2015067816 | 5/2015 |
| WO | WO2015128450 | 9/2015 |

\* cited by examiner

SENSOR AND METHOD FOR FOREIGN OBJECT DETECTION IN INDUCTION ELECTRIC CHARGER

FIELD OF THE INVENTION

The invention is generally directed to the detection of foreign objects on the main charging coil of an electric induction charger used in charging electric vehicle batteries.

BACKGROUND OF THE INVENTION

With the increasing popularity of electric vehicles, wireless or contactless induction charging is becoming of interest. In an induction charging system, a primary coil operating at a high frequency, creates an alternating magnetic field that couples a secondary coil, which produces an alternating current that can be subsequently used by on-board electronics of the electric vehicle to charge its batteries. Power is delivered from the primary coil to the secondary coil over a relatively large air gap via the magnetic coupling. The charger can operate at a high frequency (typically from 30 kHz to 140 kHz) to deliver the required power with moderate sized equipment. Resonant circuits are normally used in the primary and secondary coils to enhance power transfer, while minimizing the required voltage and current from the power supply to the primary coil.

In an example magnetic coupling structure, the primary and secondary coils may have substantially the same dimensions. In electric vehicle charging, the secondary coil can be attached to the underside of the electric vehicle, while the primary coil can lie flat on the floor of a garage, for example, or it can be buried beneath pavement in a parking lot or in the ground. When the electric vehicle has stopped and positions its secondary coil over the primary coil, the primary and secondary coils occupy substantially parallel planes separated by an air gap of, for example, a few centimeters. Electric power can then be transferred across the air gap via the magnetic coupling from the primary coil to the secondary coil on the vehicle.

SUMMARY OF THE INVENTION

The significant air gap between the primary and secondary coils of and electric vehicle induction charger permits the accidental introduction of a foreign object (FO) between the two coils that can cause significant damage to the charging system and/or the electric vehicle. Metallic foreign object lying between the primary and secondary coils will be exposed to the electromagnetic field, resulting in heating of the foreign object and a reduced magnetic field in the area around the foreign object. An example embodiment of the invention is a method and device for detecting foreign objects near the primary coil of an induction charger. A sensor array is located adjacent to the primary coil, such that the array covers at least a portion of the primary coil area. The sensors are configured to output a sensing signal in response to magnetically coupling the high frequency alternating magnetic field strength produced by the primary coil.

A controller is coupled to the sensors and is configured to scan the sensing signal of each sensor in the array. The magnetic field produced by the primary coil has a spatial distribution of magnetic intensity that varies by location across the primary coil area. If all of the sensors in the array were to have the same size and number of turns, the voltage generated by sensors located in different locations of the primary coil area would vary as a function of the location. In order for the controller to perform high speed data sampling, it is advantageous to make all sensor voltages similar in magnitude to reduce the collective dynamic range of the signals, which contributes to maintaining a high accuracy in the signal sampling.

In accordance with an example embodiment of the invention, each sensor of the array is configured to have a magnetic field sensing sensitivity that is inversely proportional to the magnetic intensity of the magnetic field produced by the primary coil at the location of the sensor with respect to the primary coil area. In this manner, all of the sensor voltages are similar in magnitude to reduce the collective dynamic range of the signals. The sensing sensitivity of a sensor may be a function of its coil area, the number of turns of its coil, or a combination of these.

The controller senses the signal of each sensor in the array and determines from the scanned sensing signals, which sensors in the array are outputting a sensing signal indicating the presence of the foreign object proximate to the sensors, the foreign object causing a perturbation in the high frequency alternating magnetic field near the sensors.

It is not unusual for the high frequency power source for the primary coil to drift in its power or frequency output, thereby causing a drift in the sensing signal output by each sensor in the array. In accordance with an example embodiment of the invention, a reference sensor coil is located in the primary coil area, having an output connected to the controller. The reference sensor coil is configured to output a reference sensing signal characterizing a time-varying magnetic intensity of the magnetic field produced by the primary coil due to any drift in its power or frequency output. The controller is configured to compensate for the time-varying magnetic intensity, in the determination of which sensors in the array are outputting a sensing signal indicating the presence of the foreign object proximate to the sensors.

In accordance with an example embodiment of the invention, to increase the accuracy in detecting the location of a foreign object on the primary coil area, the controller is configured to compute a two-dimensional convolution transform on the sensing signals received from the sensors in the array. The two-dimensional convolution transform is configured to detect sharp changes of two dimensional images of the magnetic intensity produced by a combination of the primary coil and the magnetic perturbation produced by the foreign object, the sharp changes indicating the presence of the foreign object proximate to the sensors.

In this manner, damage may be avoided that could otherwise be caused by the presence of a foreign object near the primary coil. Moreover, a more efficient charging operation may be achieved by avoiding dissipating energy by heating a foreign object.

BRIEF DESCRIPTION OF THE DRAWINGS

Example embodiments of the invention are depicted in the accompanying drawings that are briefly described as follows:

In FIGS. 8-11, the inversion line is located between zones or rings "D" and "E", in accordance with an example embodiment of the invention.

DETAILED DESCRIPTION OF THE EXAMPLE EMBODIMENTS

Figure 1:
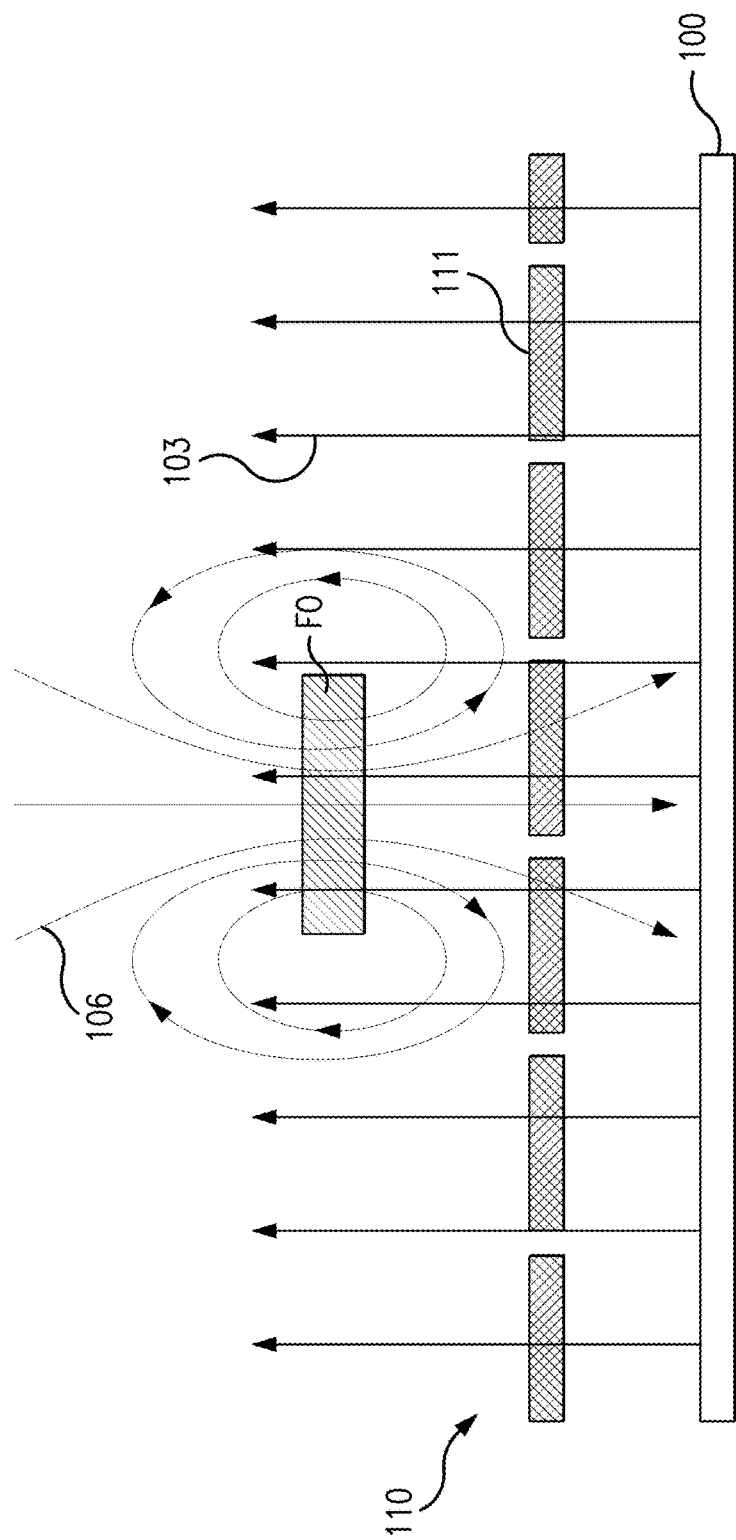
FIG. 1 illustrates an example embodiment of a device for detecting foreign objects in the vicinity of the primary coil of an induction battery charger, which magnetically couples with a secondary coil mounted on an electric vehicle for charging the battery of the electric vehicle. The figure shows an array of sensors located above the primary coil, for detecting the presence of a foreign object (FO) that can distort the magnetic field. In the example embodiment of the device shown, the magnetic field is distorted by the presence of a foreign object FO positioned above the primary coil. The particular sensor located beneath the foreign object, detects the presence of the foreign object (FO) from its distortion of the magnetic field, in accordance with an example embodiment of the invention.

FIG. 1 illustrates an example embodiment of a device for detecting foreign objects (FO) in the vicinity of the primary coil 100 of an induction battery charger. The primary coil 100 magnetically couples with a secondary coil mounted on an electric vehicle for charging the battery of the electric vehicle. The figure shows an array 110 of sensor coils 111 located above the primary coil 100, for detecting the presence of a foreign object (FO) that can distort the magnetic field 103. According to Faraday's laws of electromagnetic induction, EMF is induced in a sensor coil 111 when it is linked with the high frequency, alternating magnetic field 103 produced by the primary coil 100. In the example embodiment of the device shown, the magnetic field 103 is distorted by the presence of a foreign object FO positioned above the primary coil 100. The particular sensor coil 111 located beneath the foreign object FO, detects the presence of the foreign object (FO) from its distortion of the magnetic field 103, in accordance with an example embodiment of the invention.

The figure shows magnetic field lines representing the magnetic field 103 produced by the primary coil 100, which couple a secondary coil mounted on an electric vehicle for charging the battery of the electric vehicle. The magnetic field lines are parallel to the direction of the magnetic field 103 in the space surrounding the primary coil 100. The local density of the field lines is proportional to the magnitude of the magnetic field 103. The figure shows the sensor array 110 comprised of individual sensors 111 mounted on a suitable surface capable of supporting the sensors 111 and their associated connectors. The sensor array 110 may be located above the primary coil 100, for detecting the presence of a foreign object (FO) that would distort the magnetic field 103, in accordance with an example embodiment of the invention. For the purpose of describing the present invention, the word "array" is defined as the placement of individual sensors 111 on a surface, which is not necessarily a regular geometric pattern. The sensor mounting surface may or may not lie substantially in a single plane. The "array" may be in a rectangular configuration, a circular configuration, or other geometric configuration.

The relatively large area of the primary coil 100 produces a high frequency, alternating magnetic field 103. The current carrying wires of the primary coil 100 generate the magnetic field 103 represented by magnetic field lines that form concentric circles around the wire of the primary coil 100. The magnetic field 103 forms a closed loop, but the path of the loop depends on the conductive and magnetic properties of the surrounding materials.

The figure illustrates that the magnetic field 103 is altered by the presence of a foreign object FO positioned above the primary coil 100. The figure shows the array of sensors 110 mounted above the primary coil 100, detecting the presence of the foreign object (FO) from the distorted magnetic field, in accordance with an example embodiment of the invention.

In the case of a conducting foreign object FO, such as a metal or semiconductor, Eddy currents will circulate inside the body of the foreign object FO when it is exposed to the high frequency, alternating magnetic field 103 from the primary coil 100. The induced Eddy currents react against the magnetic field 103 from the primary coil 100 and create their own magnetic dipole field 106. The location of the foreign object FO above the primary coil 100, causes the direction of the magnetic dipole field 106 in the area directly beneath the foreign object, to be opposite to the direction of the magnetic field 103 from the primary coil 100. The resultant or combined magnetic field is the vector sum of these two oppositely directed magnetic fields, 103 and 106. The magnitude of the vector sum is reduced from the magnitude of the magnetic field 103, in the region directly beneath the foreign object FO.

In accordance with an example embodiment of the invention, the particular sensor 111 of the sensor array 110, which is located directly beneath the foreign object FO, can detect the presence of the foreign object by sensing the reduced magnetic field in the region directly below the foreign object FO.

In the case of a highly conductive foreign object FO, the total magnetic field produced by the primary coil 100 in the area directly beneath the foreign object FO may be approximately equal to zero, since the magnetic dipole field 106 created by the Eddy currents can be approximately equal to the magnetic field 103 created by the primary coil 100, but oppositely directed. FIG. 1 shows the array of sensors 110 located above the primary coil 100. The particular sensor 111 in the sensor array 110 located directly beneath the foreign object FO, can detect the presence of the foreign object from its distortion of the magnetic field, in accordance with an example embodiment of the invention.

Figure 2A:
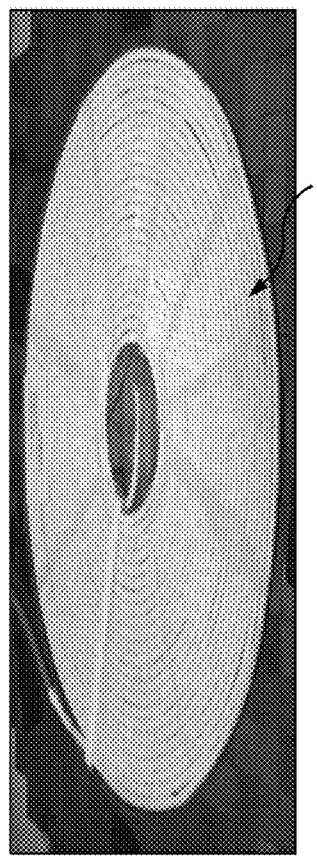
FIG. 2A illustrates an example embodiment of the primary coil shown in FIG. 1, in accordance with an example embodiment of the invention.

FIG. 2A illustrates an example embodiment of the primary coil 100 shown in FIG. 1, shown as a flat, circular coil, in accordance with an example embodiment of the invention. The primary coil 100 may be any suitable configuration such as a rectangular coil, printed coil, multilayer coils, wired coils, and the like, which may be mounted on a suitable surface. In alternate embodiments, the primary coil 100 may be incorporated into the body of a floor or underlying pavement or it can be glued to a plastic substrate forming a charging plate or paddle. An example primary coil 100 may be about 20 inches in diameter and may carry a current in a range of a hundred amps.

Figure 2B:
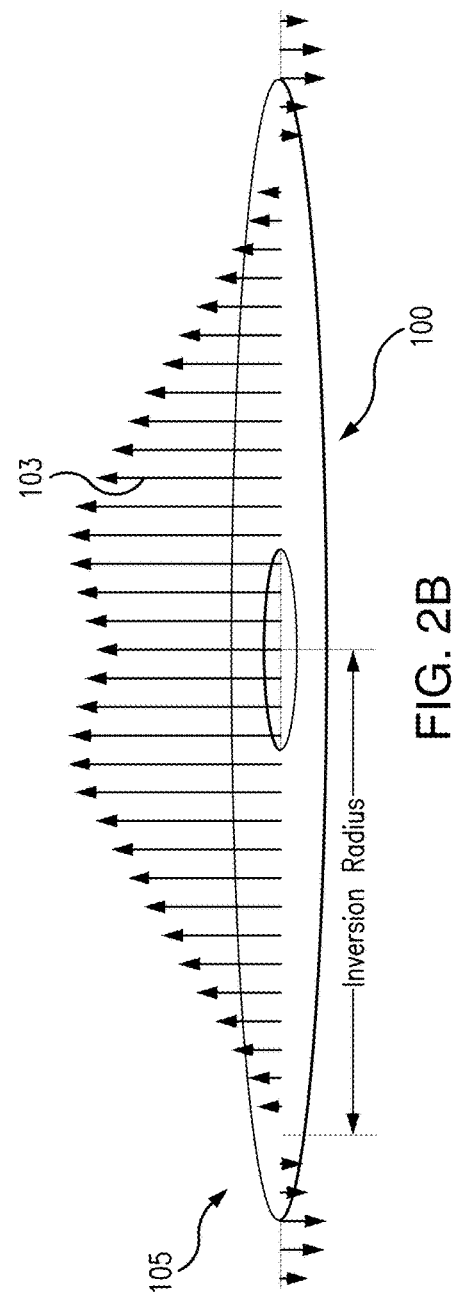
FIG. 2B illustrates an example embodiment of the primary coil shown in FIG. 2A, of an example shape and form of the magnetic field produced by the primary coil having a spatial distribution of magnetic intensity that varies by location across the primary coil area. The primary coil field's vertical component is shown undergoing an inversion at an inversion radius, which changes the direction of the primary magnetic field, in accordance with an example embodiment of the invention.

FIG. 2B illustrates an example embodiment of the primary coil 100 shown in FIG. 2A, showing an example shape and form of the magnetic field 103 produced by the primary coil. The magnetic field 103 has a spatial distribution of magnetic intensity that varies by location across the primary coil area 100, in accordance with an example embodiment of the invention. The primary coil 100 is shown having a spatial distribution of magnetic intensity 103 that varies from a maximum value toward the center of the circular shaped primary coil 100, to a minimum value toward the edge of the circular shaped coil 100. The primary coil field's vertical component 103 is shown undergoing an inversion along an inversion line 105 at an inversion radius, which changes the direction of the primary magnetic field 103, in accordance with an example embodiment of the invention.

Figure 2C:
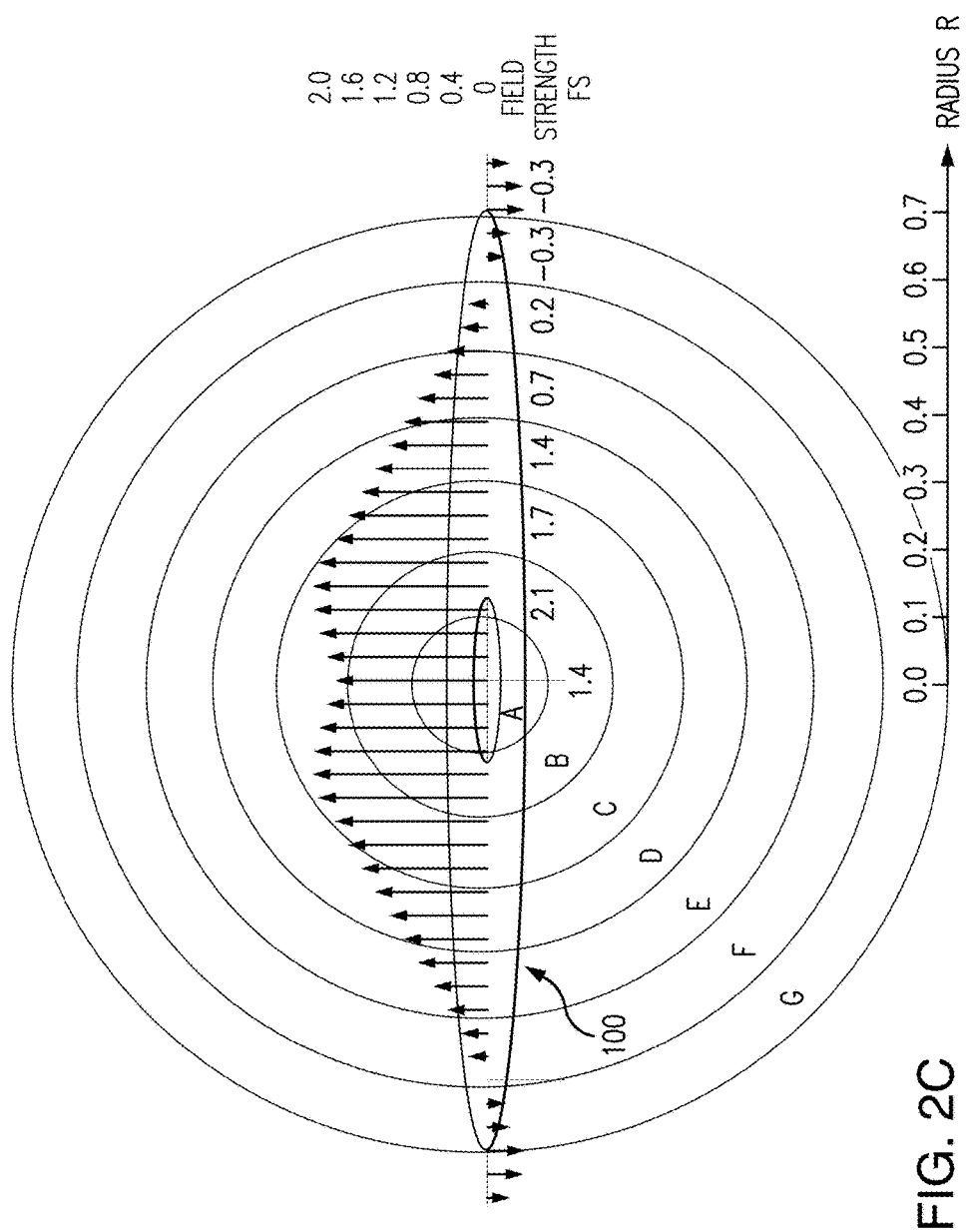
FIG. 2C illustrates an example embodiment of the primary coil shown in FIG. 2B, showing an example distribution of the field strength produced by the primary coil having a spatial distribution of magnetic intensity that varies by location across the primary coil area, in accordance with an example embodiment of the invention.

FIG. 2C illustrates an example embodiment of the primary coil 100 shown in FIG. 2B, showing an example spatial distribution of the magnetic field strength FS produced by the primary coil 100. An example magnetic field strength FS or magnetic intensity in a concentric ring surrounding the center of the primary coil 100, varies as the radius of the concentric ring, in accordance with an example embodiment of the invention. The figure illustrates an example distribution of magnetic field strength FS in concentric rings designated from the center outwardly, as A, B, C, D, E, F, and G. The magnetic field strength is expressed in arbitrary units, and has example values at various radii R, as represented in the following table:

| Ring | Radius of Ring R (arbitrary units) | Magnetic Field Strength FS (arbitrary units) |
| --- | --- | --- |
| A | 0.0 | 1.4 |
| B | 0.1 | 2.1 |
| C | 0.2 | 1.7 |
| D | 0.3 | 1.4 |
| E | 0.4 | 0.7 |
| F | 0.5 | 0.2 |
| G | 0.6 | −0.3 |
|  | 0.7 | −0.3 |

Figure 3A:
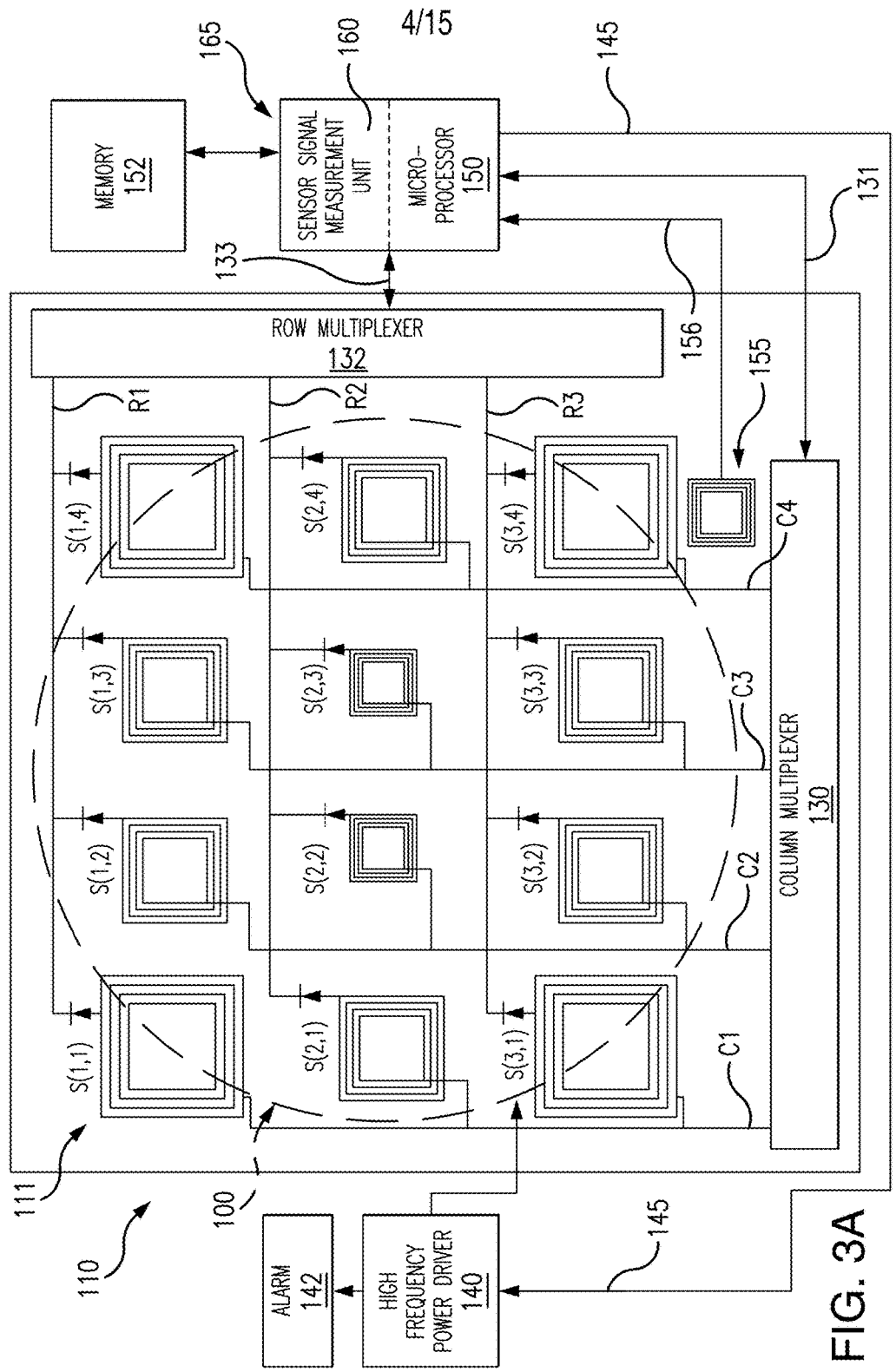
FIG. 3A illustrates an example embodiment of the device for detecting foreign objects shown in FIG. 1, showing an example rectangular array of sensor coils, with each sensor of the array being configured to have a magnetic field sensing sensitivity that is inversely proportional to the magnetic intensity of the magnetic field produced by the primary coil at a location of the sensor with respect to the primary coil area, in accordance with an example embodiment of the invention.

FIG. 3A illustrates an example embodiment of the device for detecting foreign objects shown in FIG. 1, showing an example rectangular array 110 of sensor coils 111, with each sensor of the array being configured to have a magnetic field sensing sensitivity that is inversely proportional to the magnetic intensity of the high frequency magnetic field 103 produced by the primary coil in FIG. 2B, at a location of the sensor with respect to the primary coil area. The figure shows an example rectangular layout of sensors 111 in the sensor array 110 located above the primary coil 100, in accordance with an example embodiment of the invention. The primary coil 100 may be driven by a high frequency power driver 140. Alternately, the layout of the sensor coils may be circular or another geometric arrangement.

In the following description of the invention, the sensors 111 in the sensor array 110 are designated as S(row, column) or S(R,C), in matrix notation. The sensors S(R,C) are arranged in three rows, the rows labeled R1, R2, and R3. Each row of sensors S(R,C) contains four sensors S(R,C) arranged in respective columns labeled C1, C2, C3, and C4. For example, the sensor S(R,C) located in the row R2 and column C3 is designated as S(2,3).

A controller 165 is coupled to the sensors 111 and is configured to scan the sensing signal of each sensor in the array 110. The controller may include a microprocessor 150 and a sensor signal measurement unit 160 and may be connected to a memory 152. If a foreign object FO is detected, the controller 165 can trigger an alarm 142. The high frequency magnetic field 103 produced by the primary coil has a spatial distribution of magnetic intensity that varies by location across the primary coil area 100. If all of the sensors 111 in the array 110 were to have the same size and number of turns, the voltage generated by sensors located in different locations of the primary coil area 100 would vary as a function of the location. In order for the controller 165 to perform high speed data sampling, it is advantageous to make all sensor voltages similar in magnitude, to reduce the collective dynamic range of the signals, which contributes to maintaining a high accuracy in the signal sampling.

In accordance with an example embodiment of the invention, each sensor 111 of the array 110 is configured to have a magnetic field sensing sensitivity that is inversely proportional to the magnetic intensity of the high frequency magnetic field 103 produced by the primary coil 100 at the location of the sensor 111 with respect to the primary coil area. In this manner, all of the sensor voltages are similar in magnitude to reduce the collective dynamic range of the signals. The sensing sensitivity of a sensor 111 may be a function of its coil area, the number of turns of its coil, or a combination of these.

The controller 165 senses the signal of each sensor 111 in the array 110 and determines from the scanned sensing signals, which sensors in the array are outputting a sensing signal indicating the presence of the foreign object proximate to the sensors, the foreign object causing a perturbation in the high frequency alternating magnetic field 103 near the sensors.

FIG. 3A shows the sensors 111 in the sensor array 110 are configured to have a magnetic field sensing sensitivity that is inversely proportional to the magnetic intensity of the high frequency magnetic field 103 produced by the primary coil 100 at the location of the sensor 111 with respect to the primary coil area. FIG. 2B shows the primary coil 100 having a spatial distribution of magnetic intensity 103 that varies from a maximum value toward the center of the circular shaped primary coil 100, and a minimum value toward the edge of the circular shaped coil 100. FIG. 3A shows the sensors S(2,2) and S(2,3) located near the center of the primary coil 100 where the magnetic intensity 103 is at a maximum, to have a minimum sensor coil area corresponding to a minimum sensitivity. By contrast, FIG. 3A shows the sensors S(1,1), S(1,4), S(3,1), and S(3,4) located near the edge of the primary coil 100 where the magnetic intensity 103 is at a minimum, to have a maximum sensor coil area corresponding to a maximum sensitivity. In this manner, all of the sensor voltages are similar in magnitude to reduce the collective dynamic range of the signals. The sensing sensitivity of a sensor may be a function of its coil area, the number of turns of its coil, or a combination of these.

An important consideration in selection of the sensor sizes is the different levels of heating produced in a foreign object FO when it placed in different locations on the primary coil 100. The most heating is produced in the highest field areas, but also the power consumed by an object depends on its size, since larger objects consume more inductive power for a given level of applied field. Therefore, the sensor 111 sizes for the lower field (power) locations may be safely made bigger, as smaller objects would not be heated so much in those locations anyway. These considerations allow simplifying the design and still keep foreign object FO detection levels acceptable.

It is not unusual for the high frequency power source for the primary coil 100 to drift in its power or frequency output, thereby causing a drift in the sensing signal output by each sensor 111 in the array 110. In accordance with an example embodiment of the invention, a reference sensor coil 155 is located in or immediately adjacent to the primary coil area 100, having an output connected to the controller 165. The reference sensor coil 155 is configured to output a reference sensing signal characterizing a time-varying magnetic intensity of the magnetic field 103 produced by the primary coil 100 due to any drift in its power or frequency output. The controller 165 is configured to compensate for the time-varying magnetic intensity, in the determination of which sensors 111 in the array 110 are outputting a sensing signal indicating the presence of the foreign object FO proximate to the sensors.

Precise measurement of the magnitude of the oscillating voltage produced by the sensor coils 111 requires sampling by the controller 165 at multiple instants within the period of the oscillation, and repetitive sampling over many such periods. It is possible that an inverter powering the primary coil 100 might adjust its output power during this timeframe. In this case, if the voltages from the various sensor coils 111 are sampled one after another (at different instants in time), these time variations of the main power level might be misinterpreted as spatial variations in the magnetic field 103 across the sensor coil array 110. In other words, the time variations could introduce errors in the measured "profile" of the magnetic field 103, because of the sequential nature of the coil scanning process. Since changes in the magnetic field 103 profile and the resulting differences in adjacent sensor readings are the basis of the foreign object FO detection process, any such errors could cause faulty readings, such as false detection of a foreign object FO, or failure to detect an actual foreign object FO.

To compensate for the influence of possible time-based variations in system power, the extra "reference" sensor coil 155 is added to the coil set. The "reference" coil data are sampled simultaneously with each "signal" data using two parallel ADC inputs in the controller 165. In this way, each signal coil's 111 voltage can be calculated as a ratio to the reference coil 155 voltage, thereby helping to compensate for possible changes of power during the data collection process. Even if the main power changes with time, the ratio of "signal" to "reference" voltages would be the same, which improves the integrity of the data.

Another method for performing this function is to use any one of data sensors 111, for instance S(3,3), as a reference coil, so at any sampling instant two coil signals would be sampled: the S(3,3) (reference) signal and one of other coils. The resulting ratio of signals would again provide a measure of immunity against mistaking any time variations for spatial variations the profile measurement.

Figure 3B:
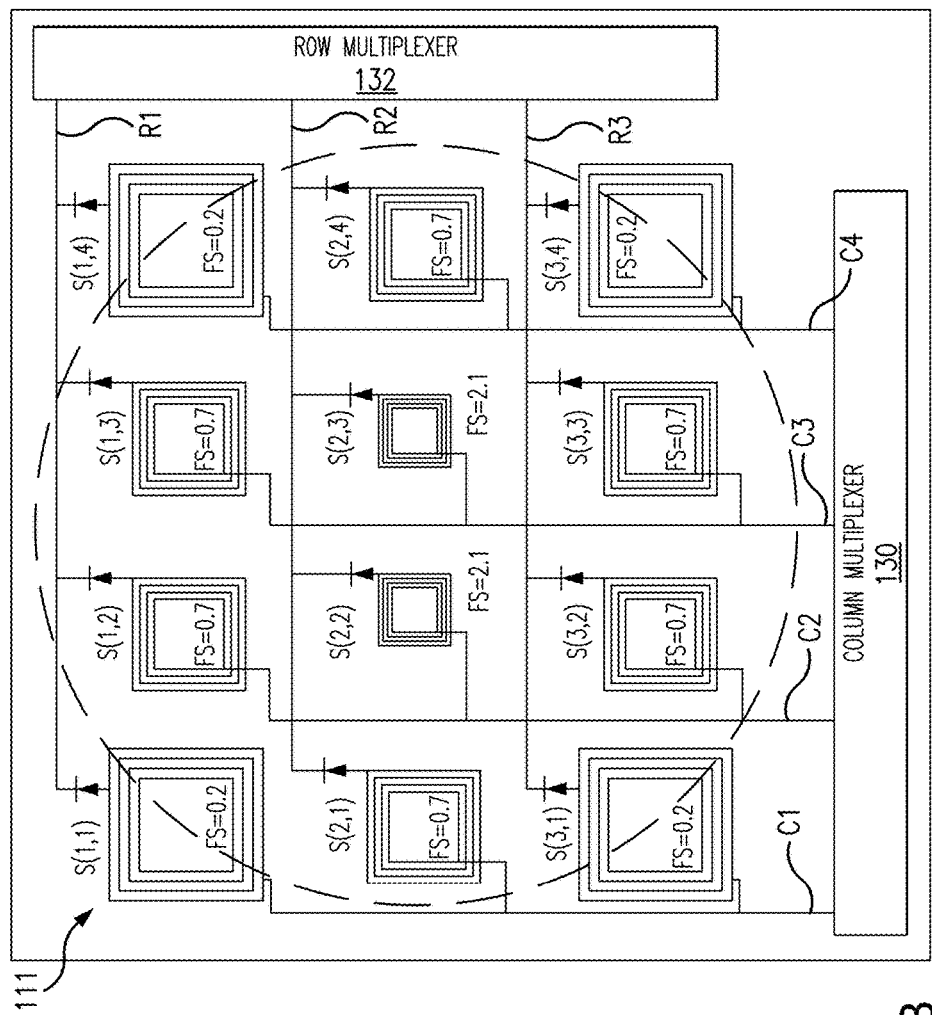
FIG. 3B illustrates the example embodiment of the device for detecting foreign objects shown in FIG. 3A, showing an example distribution of the field strength produced by the primary coil at the respective rectangular array of sensor coils shown in FIG. 3A, in accordance with an example embodiment of the invention.

FIG. 3B illustrates the example embodiment of the device for detecting foreign objects shown in FIG. 3A, showing an example distribution of the field strength FS of the high frequency magnetic field 103 produced by the primary coil 100 at the respective rectangular array of sensor coils 111 shown in FIG. 3A, in accordance with an example embodiment of the invention. The magnetic field strength FS, expressed in arbitrary units, is shown at the respective rectangular array of sensor coils 111, designated as S(row, column) or S(R,C), in matrix notation. The induced EMF in a sensor coil 111 is equal to the negative of the rate of change of magnetic flux of the magnetic field 103 passing through the area of the sensor coil 111, times the number of turns in the sensor coil 111. Each sensor 111 of the array 110 is configured to have a magnetic field sensing sensitivity that is inversely proportional to the magnetic intensity of the magnetic field 103 produced by the primary coil 100 at the location of the sensor 111. In this manner, all of the sensor voltages are similar in magnitude, to reduce the collective dynamic range of the signals. The sensing sensitivity of a sensor 111 may be a function of its coil area, the number of turns of its coil, or a combination of these.

The following table gives example sensor coil areas for the respective rectangular array of sensor coils 111, so that all of the sensor voltages are similar in magnitude, to reduce the collective dynamic range of the signals:

| Sensor Coil | Magnetic Field Strength (arbitrary units) | Area of Sensor Coil (arbitrary units) |
| --- | --- | --- |
| S(1,1) | 0.2 | 50 |
| S(1,2) | 0.7 | 14 |
| S(1,3) | 0.7 | 14 |
| S(1,4) | 0.2 | 50 |
| S(2,1) | 0.7 | 14 |
| S(2,2) | 2.1 | 5 |
| S(2,3) | 2.1 | 5 |
| S(2,4) | 0.7 | 14 |
| S(3,1) | 0.2 | 50 |
| S(3,2) | 0.7 | 14 |
| S(3,3) | 0.7 | 14 |
| S(3,4) | 0.2 | 50 |

In this manner, the resulting sensor voltages are similar in magnitude to reduce the collective dynamic range of the signals. Each sensor of the array is configured to have a magnetic field sensing sensitivity that is inversely proportional to the magnetic intensity of the magnetic field produced by the primary coil at a location of the sensor with respect to the primary coil area, by adjusting the sensor's coil area and a number of turns of its coil.

In an alternate embodiment, the larger area sensor coils S(1,1), S(1,4), S(3,1), and S(3,4) located near the edge of the primary coil 100, may be reduced in size, in order to maintain some precision in locating foreign objects FO with these four sensor coils. In order to design the sensitivity of the sensor coils S(1,1), S(1,4), S(3,1), and S(3,4) to be inversely proportional to the magnetic intensity of the primary coil 100, extra turns may be given to these four coils, as shown in the following table:

| Sensor Coil | Magnetic Field Strength (arbitrary units) | Area of Sensor Coil (arbitrary units) | Turns of Sensor Coil |
| --- | --- | --- | --- |
| S(1,1) | 0.2 | 10 | 5 |
| S(1,4) | 0.2 | 10 | 5 |
| S(3,1) | 0.2 | 10 | 5 |
| S(3,4) | 0.2 | 10 | 5 |

In this manner, the resulting sensor voltages are similar in magnitude to reduce the collective dynamic range of the signals.

Figure 4:
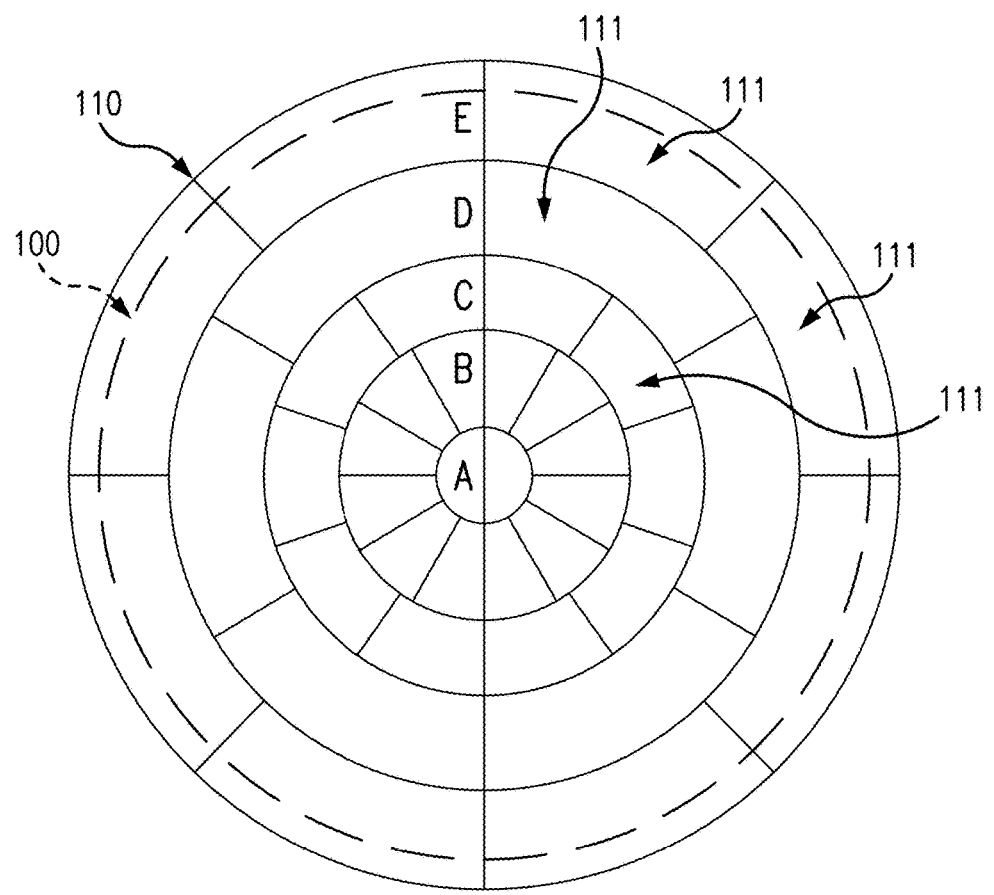
FIG. 4 illustrates an example embodiment of the device for detecting foreign objects shown in FIG. 1, showing an example of a circular primary coil and a circular array of sensor coils, whose shapes may be tailored to the configuration of the main magnetic field produced by the primary coil, considering variations in the magnitude of the field strength, in accordance with an example embodiment of the invention.

FIG. 4 illustrates an example embodiment of the device for detecting foreign objects shown in FIG. 1, showing an example of a circular primary coil 100 and a circular array 110 of sensor coils 111, whose shapes may be tailored to the configuration of the main magnetic field 103 produced by the primary coil 100. Concentric rings of the circular array 110 are designated from the center outwardly, as A, B, C, D, and E. The shapes of the sensor coils 111 may be tailored, considering variations in the magnitude of the field strength 103 with respect to the distance of the sensor coil from the center of the array, in accordance with an example embodiment of the invention.

Figure 5A:
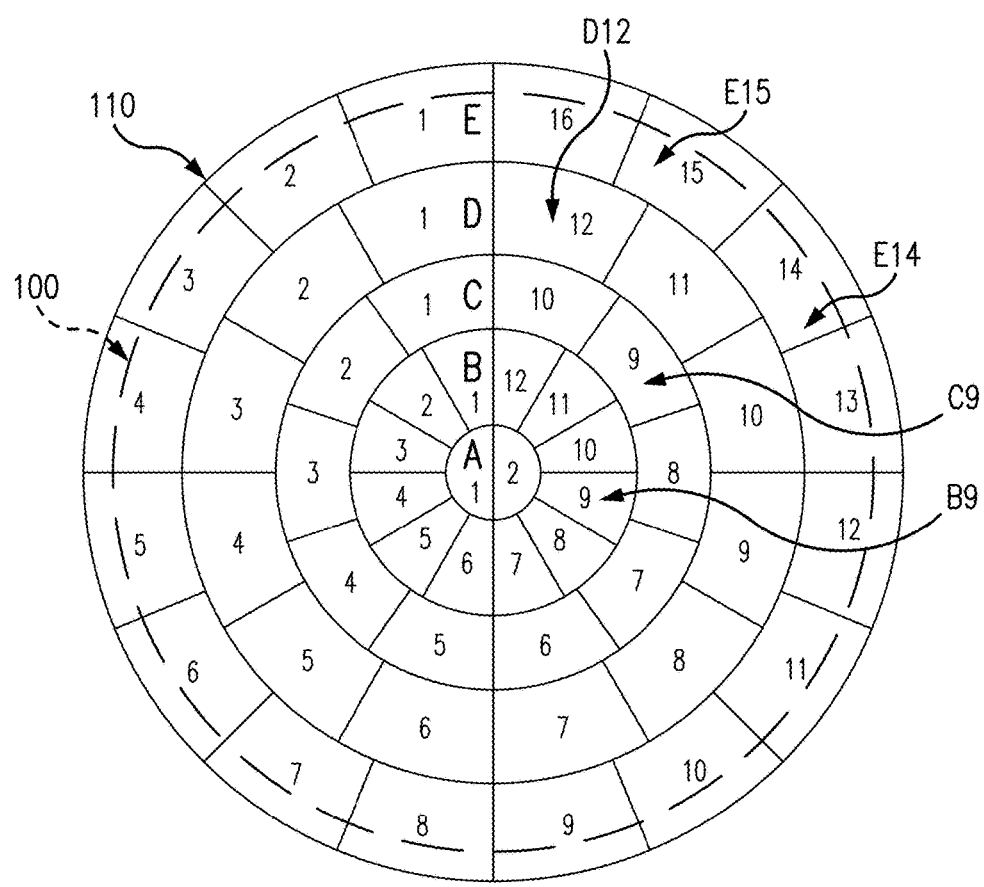
FIG. 5A illustrates another example embodiment of the device for detecting foreign objects shown in FIG. 1, showing an example of a circular primary coil and a circular array of sensor coils. The sizes of the coils in the low field area at a larger radius, are made smaller to maintain a precision in locating foreign objects. However, the coils in the low field area are made with an increased number of turns. In this manner, each sensor of the array is configured to have a magnetic field sensing sensitivity that is inversely proportional to the magnetic intensity of the magnetic field produced by the primary coil at that location, in accordance with an example embodiment of the invention.

FIG. 5A illustrates another example embodiment of the device for detecting foreign objects shown in FIG. 1, showing an example of a circular primary coil 100 and a circular array 110 of sensor coils 111, whose shapes may be tailored to the configuration of the main magnetic field 103 produced by the primary coil 100. As is shown in FIG. 2C, the magnetic intensity produced by the primary coil 100 decreases as the radius increases. However, in a circular array, the area occupied by a sector increases as the average radius of the sector increases. In order to maintain some precision in locating foreign objects FO with the circular sensor array 110, the area of the sensor coils 111 must be kept small. In order to design the sensitivity of the sensor coils 111 to be inversely proportional to the magnetic intensity of the primary coil 100, extra turns are given to the sensor coils 111 in sectors with a larger radius, and the size of the coils in the low field area are made smaller. For example, the sensor coils 111 in the D and E rings of the array of FIG. 5A, may be made smaller in area and given an increased number of turns, keeping the sensitivity proportionally smaller, in accordance with an example embodiment of the invention.

Figure 5B:
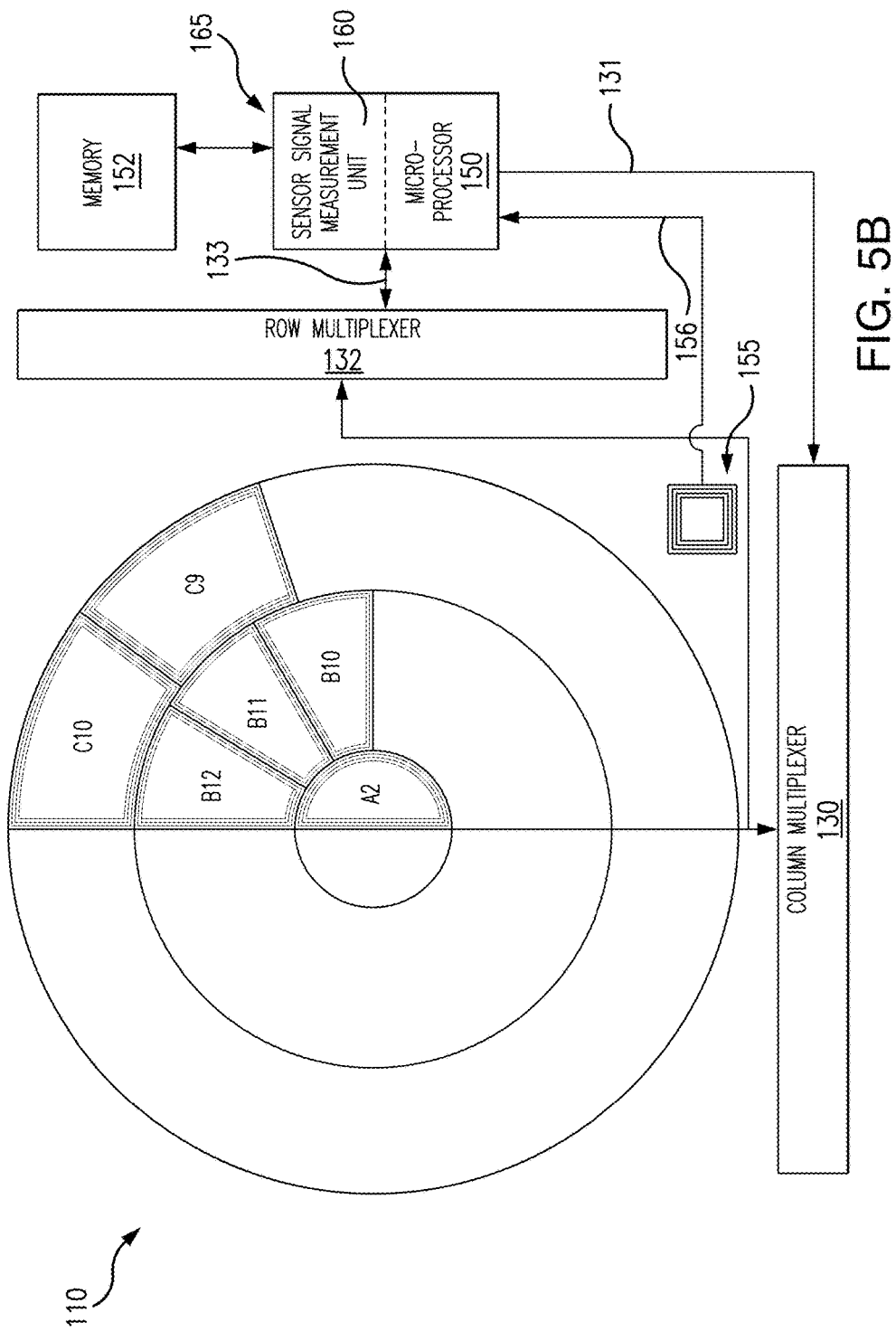
FIG. 5B illustrates a more detailed view of the example embodiment of FIG. 5A, showing the sensor coils, whose shapes fit within the pie-shaped areas of the circular array. The figure shows an example of how the sensor coils in the circular array may be connected to a controller that is configured to scan the sensing signal of each sensor in the array. Each sensor of the array is configured to have a magnetic field sensing sensitivity that is inversely proportional to the magnetic intensity of the magnetic field produced by the primary coil at that location, in accordance with an example embodiment of the invention.

An example coordinate system is shown to identify the sensor coils 111 in the array 110, wherein the circular rings are given letter designations A, B, C, D, and E starting from the center of the array and the pie-shaped sectors are given number designations 1, 2, etc. starting with the upper left position in each ring. Individual sensor coils 111 may be designated by the pie-shaped areas, S(ring, angle), of the circular array 110, as shown in FIG. 5B. For example, sensor coil D12 is located in the "D" ring and the "12" angle.

The configurations shown in FIGS. 4 and 5 are examples for a circular primary coil, but could be made of different shapes for differently shaped primary coils, taking into consideration the guidelines from the preceding paragraphs. In other words, the sensor coil shapes should in general be tailored to the configuration of the main magnetic field, considering variations magnitude field strength and the location of the inversion line.

FIG. 5B illustrates a more detailed view of the example embodiment of FIG. 5A, showing the sensor coils 111, whose shapes fit within the pie-shaped areas of the circular array 110. As discussed above, it is advantageous to make all sensor voltages similar in magnitude, to reduce the collective dynamic range of the signals, which contributes to maintaining a high accuracy in the signal sampling. This is accomplished by making the magnetic field sensing sensitivity of each sensor coil inversely proportional to the magnetic intensity of the magnetic field 103 produced by the primary coil 100 at the location of the sensor coil.

The following table gives example sensor coil areas and coil turns for the respective circular array of sensor coils A2, B10, B11, B12, C9, and C10, so that all of the sensor voltages are similar in magnitude, to reduce the collective dynamic range of the signals:

| Sensor Coil | Magnetic Field Strength (arbitrary units) | Area of Sensor Coil (arbitrary units) | Turns of Sensor Coil |
|---|---|---|---|
| A2 | 1.4 | 7 | 1 |
| B10 | 0.7 | 14 | 1 |
| B11 | 0.7 | 14 | 1 |
| B12 | 0.7 | 14 | 1 |
| C9 | 0.2 | 21 | 2 |
| C10 | 0.2 | 21 | 2 |

For example, the sensor coil 111 in the centrally located sector A2, is exposed to a relatively high magnetic intensity of 1.4 units from the primary coil 100. The relatively small coil area of the sensor coil 111 in the centrally located sector A2 limits the sensitivity of the sensor in sector A2.

As another example, the sensor coil 111 in the intermediately located sector B11, is exposed to an intermediate level of magnetic intensity of 0.7 units from the primary coil 100. The intermediately sized coil area of the sensor coil 111 in the intermediate located sector B11 provides an intermediate sensitivity of the sensor in sector B11, to approximately match the sensitivity of the sensor coil in A2.

As still another example, the sensor coil 111 in the outer located sector C9, is exposed to a relatively low level of magnetic intensity of 0.2 units from the primary coil 100. The larger sized coil area of the sensor coil 111 in the outer located sector C9 may not be sufficient to approximately match the sensitivity of the sensor coil in A2 or in B11. The sensitivity of the sensor coil 111 in the outer located sector C9 may be augmented by adding an additional turn to the coil, to approximately match the sensitivity of the sensor coil in A2 or in B11.

In this manner, the resulting sensor voltages are similar in magnitude to reduce the collective dynamic range of the signals.

The figure shows an example of how the sensor coils in the circular array may be connected to the controller 165 that is configured to scan the sensing signal of each sensor in the array. The wire makes a sensor coil with a number of turns and then is routed down to the controller 165 as a twisted pair to avoid coupling a signal from along the route.

The controller 165 is coupled to the sensors 111 and is configured to scan the sensing signal of each sensor in the array 110. The magnetic field 103 produced by the primary coil has a spatial distribution of magnetic intensity that varies by location across the primary coil area 100. If all of the sensors 111 in the array 110 were to have the same size and number of turns, the voltage generated by sensors located in different locations of the primary coil area 100 would vary as a function of the location. In order for the controller 165 to perform high speed data sampling, it is advantageous to make all sensor voltages similar in magnitude, to reduce the collective dynamic range of the signals, which contributes to maintaining a high accuracy in the signal sampling.

In accordance with an example embodiment of the invention, each sensor 111 of the array 110 is configured to have a magnetic field sensing sensitivity that is inversely proportional to the magnetic intensity of the magnetic field 103 produced by the primary coil 100 at the location of the sensor 111 with respect to the primary coil area. In this manner, all of the sensor voltages are similar in magnitude to reduce the collective dynamic range of the signals. The sensing sensitivity of a sensor 111 may be a function of its coil area, the number of turns of its coil, or a combination of these.

The controller 165 senses the signal of each sensor 111 in the array 110 and determines from the scanned sensing signals, which sensors in the array are outputting a sensing signal indicating the presence of the foreign object proximate to the sensors, the foreign object causing a perturbation in the high frequency alternating magnetic field 103 near the sensors.

The reference sensor coil 155 is configured to output a reference sensing signal characterizing a time-varying magnetic intensity of the magnetic field 103 produced by the primary coil 100 due to any drift in its power or frequency output. The controller 165 is configured to compensate for the time-varying magnetic intensity, in the determination of which sensors 111 in the array 110 are outputting a sensing signal indicating the presence of the foreign object FO proximate to the sensors. The reference sensor coil 155 may be located in or immediately adjacent to the primary coil area 100. In embodiments of the invention, the reference sensing coil may be a sensor of the sensor array.

The introduction of a foreign object FO adds an eddy-current-generated magnetic field 106 to the main magnetic field 103 of the primary coil 100. The magnetic field vector of the eddy current reduces the total field under the foreign object FO and slightly increases it outside. An example of the magnetic field distortion produced by a small foreign object FO is shown in FIGS. 6 and 7.

Figure 6:
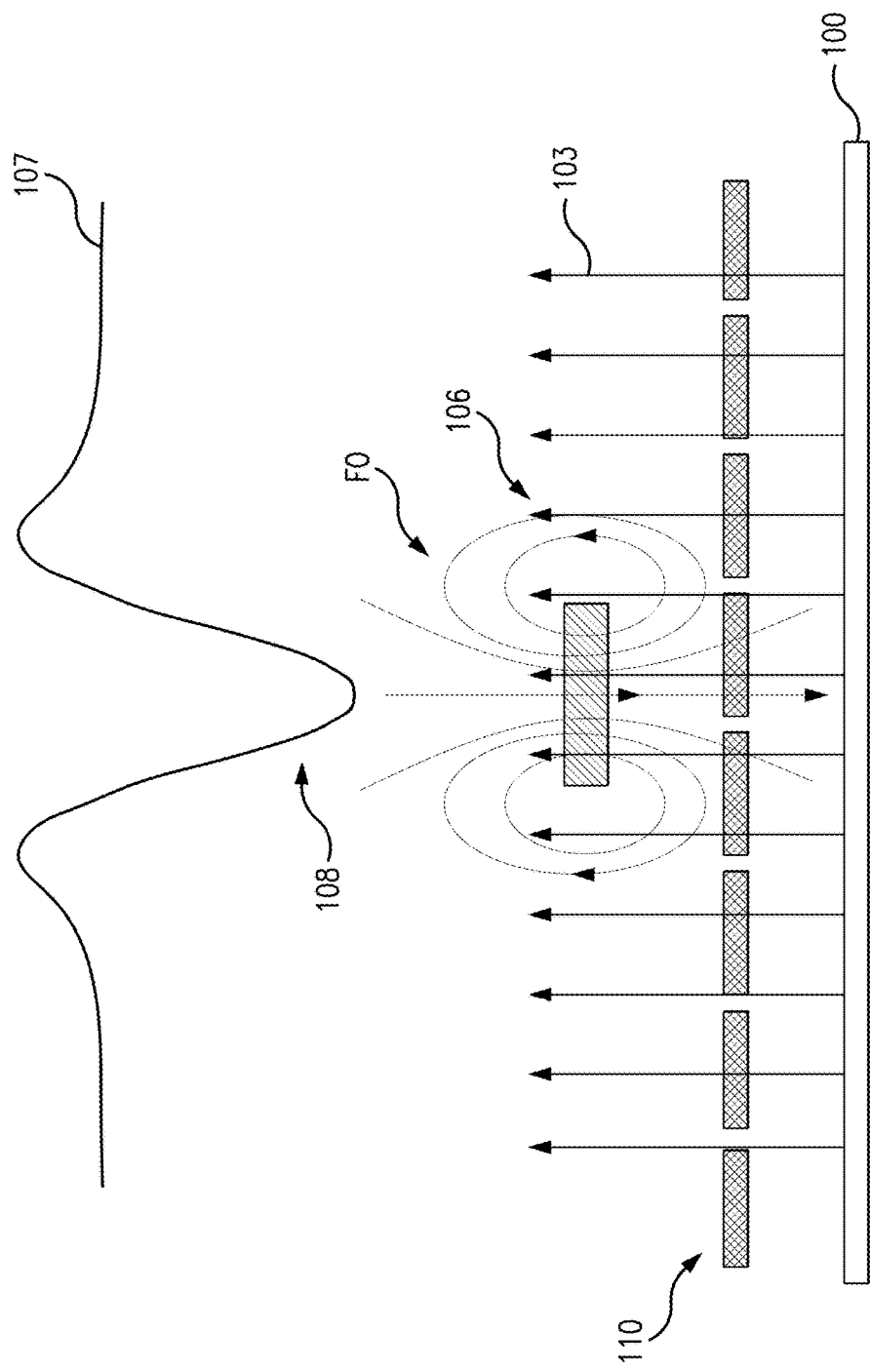
FIG. 6 illustrates an example embodiment of a device for detecting foreign objects in the vicinity of the primary coil of an induction battery charger, wherein the introduction of a foreign object adds an eddy-current-generated magnetic field to the main magnetic field of the primary coil. The magnetic field vector of the eddy current reduces the total field under the foreign object and slightly increases it outside, in accordance with an example embodiment of the invention.

FIG. 6 illustrates an example embodiment of a device for detecting foreign objects in the vicinity of the primary coil 100 of an induction battery charger. The introduction of a foreign object FO adds an eddy-current-generated magnetic field 106 to the main magnetic field 103 of the primary coil 100, producing a combined magnetic intensity 107. The magnetic field 106 vector of the eddy current reduces the total field 103 under the foreign object FO and slightly increases it outside, shown in the figure as the distortion 108 in the combined magnetic intensity 107, in accordance with an example embodiment of the invention.

Figure 7:
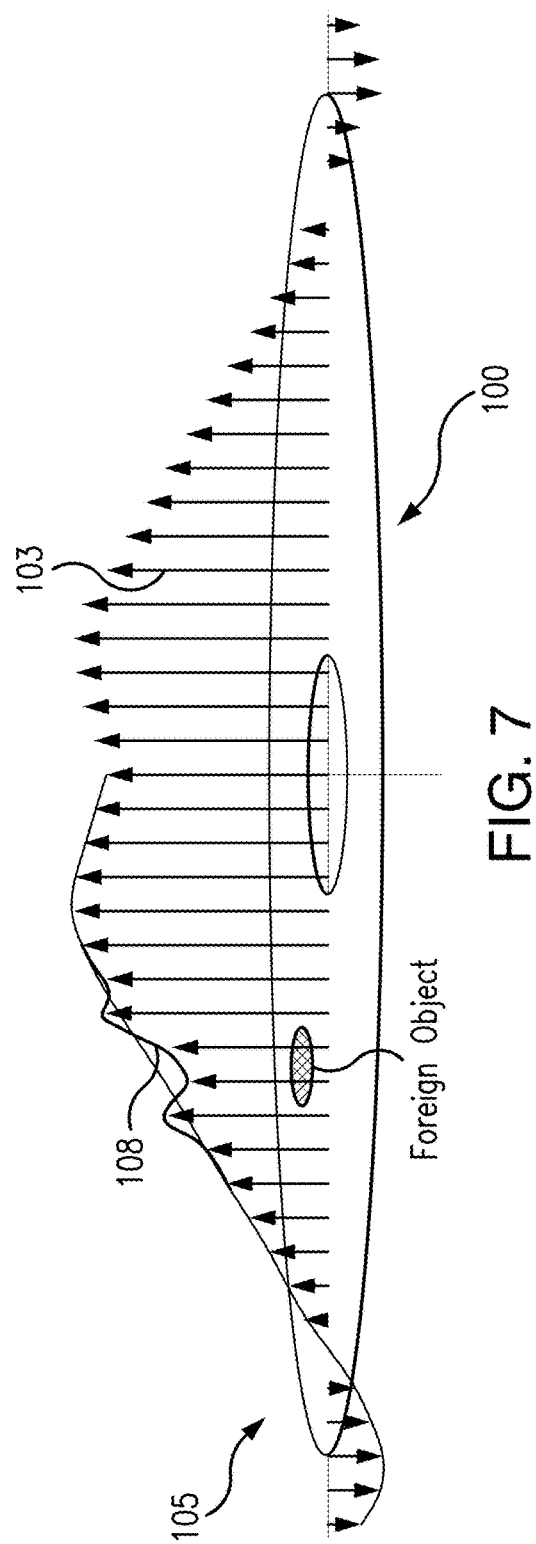
FIG. 7 illustrates an example embodiment of the primary coil shown in FIG. 6, of an example shape and form of two dimensional images of magnetic intensity produced by a combination of the primary coil and the foreign object, the sharp changes indicating the presence of the foreign object proximate to the sensors, in accordance with an example embodiment of the invention.

FIG. 7 illustrates an example embodiment of the primary coil 100 shown in FIG. 6, of an example shape and form of two dimensional images of combined magnetic intensity 107 produced by a combination of the primary coil 100 and the foreign object FO. The sharp changes or distortion 108 in the combined magnetic intensity 107 indicate the presence of the foreign object FO proximate to the sensors, in accordance with an example embodiment of the invention.

One way to detect sharp changes or distortion 108 is to apply a two-dimensional convolution transform on the data received from the magnetic field sensors:

$$S(x, y) = \sum_a \sum_b f(a, b) g(x-a, y-b) \quad [1]$$

where f(x,y) is a signal measured at point (x,y), and g(x, y) is a Laplacian 3*3 convolution kernel $$\begin{array}{|c|c|c|} \hline -1 & -1 & -1 \\ \hline -1 & 8 & -1 \\ \hline -1 & -1 & -1 \\ \hline \end{array} \quad [2]$$

Such a transform is known to detect sharp changes or "edges" of two dimensional images produced by foreign object FO, while hiding "slow" changes, which are related to the geometry of the charger's primary-secondary coils system.

Considering the circular positioning of the sensor coils 111, one possible way to calculate the convolution is to use a set of kernel arrays individually predefined for each sensor.

Figure 8:
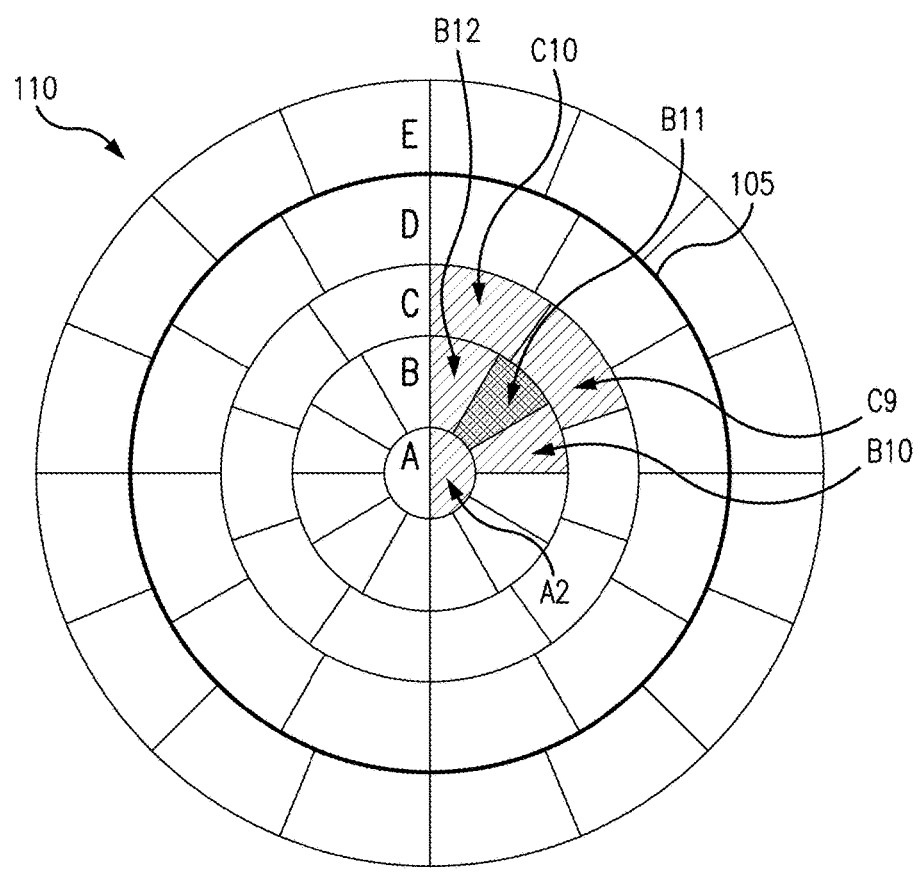
FIG. 8 illustrates another example embodiment of the device for detecting foreign objects shown in FIG. 1, showing an example of a circular primary coil and a circular array of sensor coils, whose shapes may be tailored to the configuration of the main magnetic field produced by the primary coil. A convolution kernel array containing six elements, is designed to detect a foreign object over the sensor located in the "red" cell. The "red" element of the array represents the center element of the kernel, while the green elements represent items peripheral to the kernel, and the total of all their values should be zero, in accordance with an example embodiment of the invention.

For example, in FIG. 8, a convolution kernel array, designed to detect a foreign object FO over the sensor located in the "red" cell, contains six elements or pie-shaped sectors. Referring to FIG. 5B, the six elements or pie-shaped sectors are A2, B10, B11, B12, C9 and C10. The "red" element B11 of the array would represent the center element of the kernel [2], while the green elements A2, B10, B12, C9 and C10 represent items peripheral to the kernel, and the total of all their values should be zero, as shown in equation [4]. A resulting reading for foreign object detection for the particular sensor is represented by:

$$S = f_{Red} \cdot C_{Red} + \sum_{Green} f_{Green} C_{Green} \quad [3]$$

Where $f_{xxx}$ are the sensor readings, and $C_{XXX}$ are the kernel coefficients corresponding to the sensor location, so $$\sum_{Red, Greens, Yellow} C_X = 0, \text{ and} \quad [4]$$

$$C_{Green, Yellow} = -\frac{C_{Red}}{N-1} \quad [5]$$

where N is the number of points used in this particular function (i.e., the number of "colored" cells).

Figure 9:
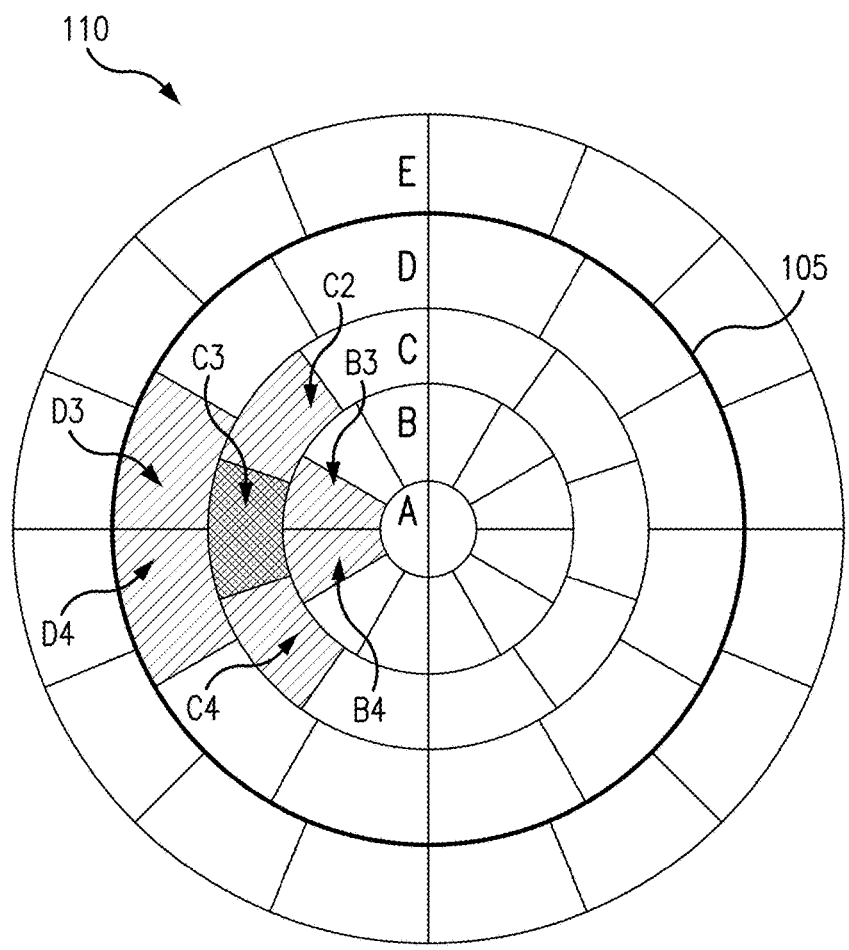
FIGS. 9, 10, and 11 illustrate other example embodiments of the device for detecting foreign objects shown in FIG. 8, showing an individual kernel array predefined for each sensor coil, wherein each array's "center" element of the kernel is marked by "red" and has a positive value, while peripheral elements are marked by "green" or "yellow" and have negative values whose total is equal, but opposite to, the value of the center element.
Figure 10:
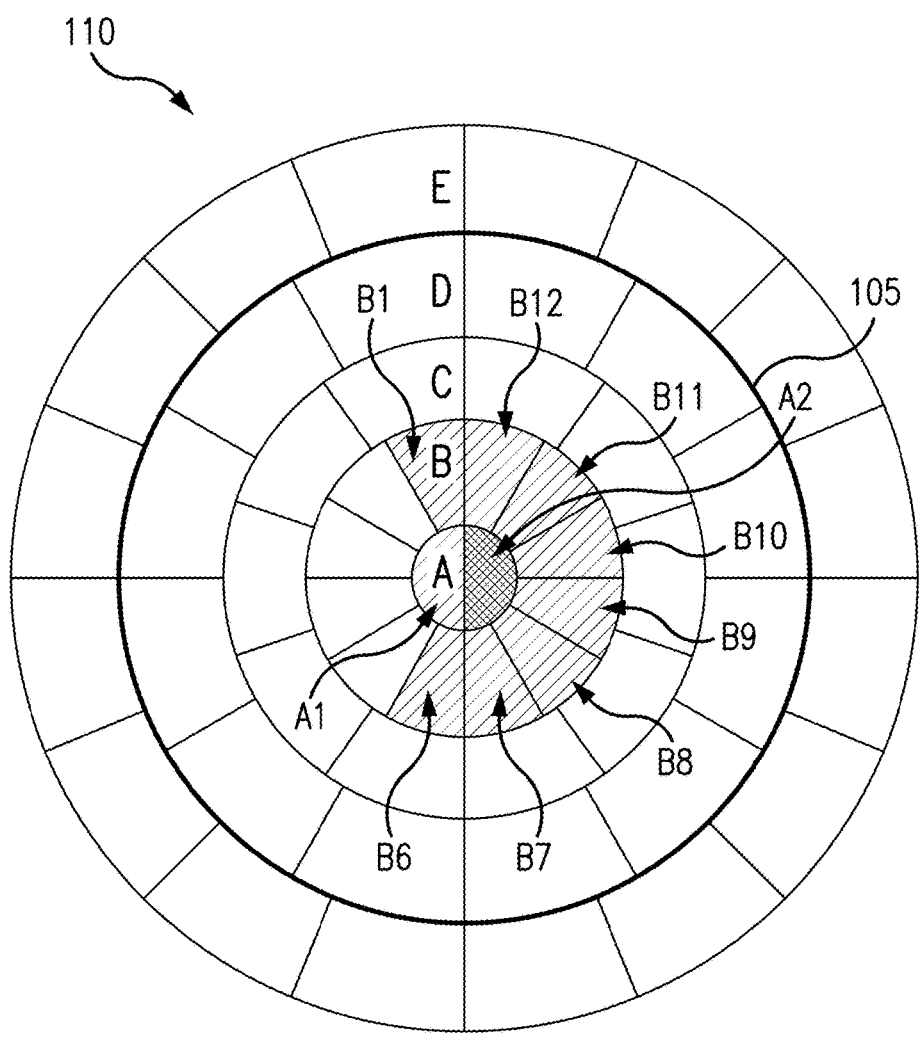
Figure 11:
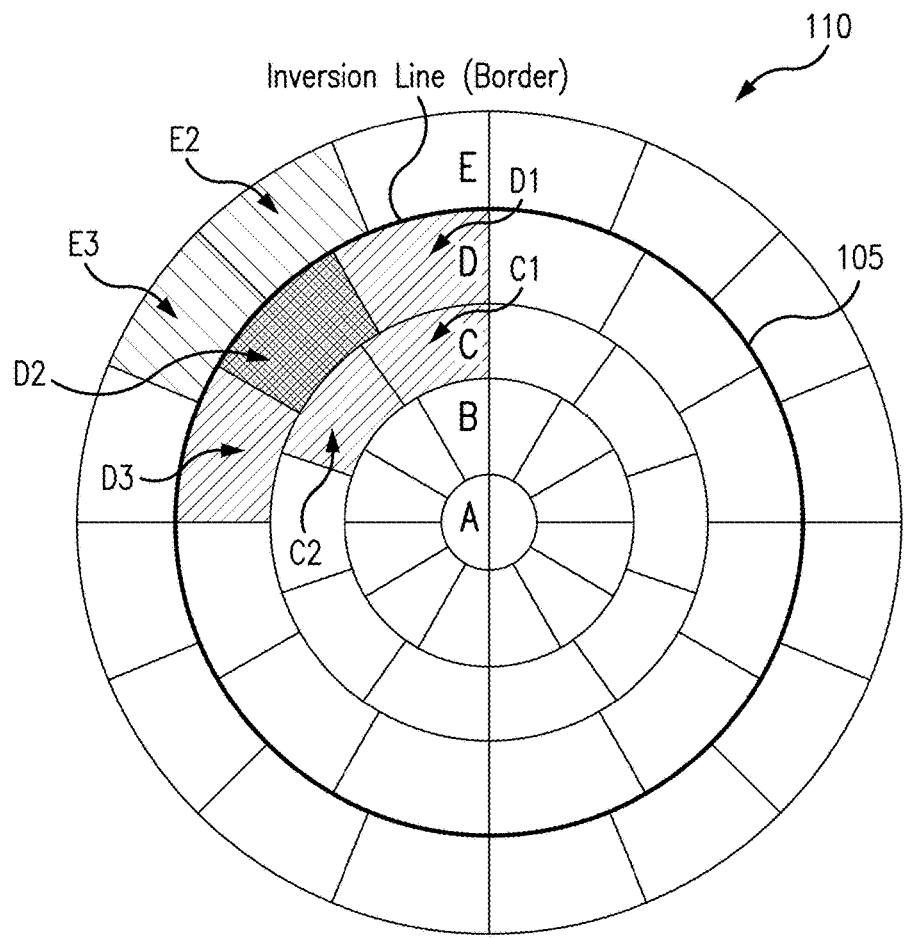

An individual kernel array is predefined for each sensor coil (see additional examples in FIGS. 9, 10, and 11). Here each array's "center" element of the kernel [2] is marked by "red" and has a positive value, while peripheral elements are marked by "green" or "yellow" and have negative values whose total is equal but opposite to the value of the center element, satisfying the requirement of equation [4].

For example, in FIG. 9, a convolution kernel array, designed to detect a foreign object FO over the sensor located in the "red" cell, contains seven elements or pie-shaped sectors. Referring to FIG. 5A, the seven elements or pie-shaped sectors are B3, B4, C2, C3, C4, D3 and D4. The "red" element C3 of the array would represent the center element of the kernel [2], while the green elements B3, B4, C2, C4, D3 and D4 represent items peripheral to the kernel, and the total of all their values should be zero, as shown in equation [4].

For example, in FIG. 10, a convolution kernel array, designed to detect a foreign object FO over the sensor located in the "red" cell, contains ten elements or pie-shaped sectors. Referring to FIG. 5A, the ten elements or pie-shaped sectors are A1, A2, B1, B6, B7, B8, B9, B10, B11, and B12. The "red" element A2 of the array would represent the center element of the kernel [2], while the green elements A1, B1, B6, B7, B8, B9, B10, B11, and B12 represent items peripheral to the kernel, and the total of all their values should be zero, as shown in equation [4].

For example, in FIG. 11, a convolution kernel array, designed to detect a foreign object FO over the sensor located in the "red" cell, contains seven elements or pie-shaped sectors. Referring to FIG. 5A, the seven elements or pie-shaped sectors are C1, C2, D1, D2, D3, E2, and E3. The "red" element D2 of the array would represent the center element of the kernel [2], while the green or yellow elements C1, C2, D1, D3, E2, and E3 represent items peripheral to the kernel, and the total of all their values should be zero, as shown in equation [4].

As was pointed out above, a foreign object FO produces opposite magnetic field vectors under the foreign object FO and outside of the foreign object FO, so the magnetic field reading in the "red" area tends to decrease, while in the "green" areas it tends to increase. The convolution kernel array just described has a similar shape or distribution, so applying it to a region containing a foreign object FO tends to reinforce the measured signal both under the foreign object FO and outside the foreign object FO, resulting in a stronger output signal when a foreign object FO is present. Conversely, any smooth spatial variations resulting from the normal (undistorted) profile of the primary coil tend to produce readings near zero, due to the property of the convolution kernel array having equal positive and negative areas. Therefore, the use of the transform described above enhances the detection signal in the presence of a foreign object FO, while reducing sensitivity to non-foreign object FO related smooth changes of the magnetic field produced by geometry of the primary coil.

An important special case of the transform calculation is the situation where the kernel area includes sensors straddling both "inverted" and "non-inverted" zones of the primary coil 100. As was discussed earlier, the primary coil field's vertical component 103 demonstrates an "inversion" 105, which changes the effect of the foreign object FO field 106 on the primary magnetic field 103: the same foreign object FO-generated field increases the total or combined field 107 on one side of the inversion line 105, but decreases it on the other side. See also FIG. 12 for an illustration of the effect.

Such areas require changing the signs of the addends for the corresponding (inverted) cells in equation [3]. For instance, in FIG. 11 a foreign object is placed in cell D2 near the inversion line 105, located between zones (rings) "D" and "E." In this case the foreign object FO eddy current field 106 increases the reading in the surrounding "green" cells C1, C2, D1, and D3, but it decreases the reading in cells E2 and E3 located in the area with inverted field ("E"), marked by "yellow." To take this effect into account, the "inversion" elements of the convolution function have to be used with opposite sign:

$$S = f_{Red} \cdot C_{Red} + \sum_{Green} f_{Green} C_{Green} - \sum_{Yellow} f_{Yellow} C_{Yellow} \quad [6]$$

The "yellow" kernel items E2 and E3 are defined as items located in the "inverted" zone with respect to the location of the central ("red") kernel item D2. Again, the correlation function has the property that the sum of all its element values totals to zero, as shown above in equation [4].

The controller may be configured to compute a modified two-dimensional convolution transform on the sensing signals received from the sensors in the array, where the sensors in the array are juxtaposed with a magnetic intensity produced by the primary coil, which undergoes an inversion that changes the direction of the magnetic intensity produced by the primary coil.

Figure 12:
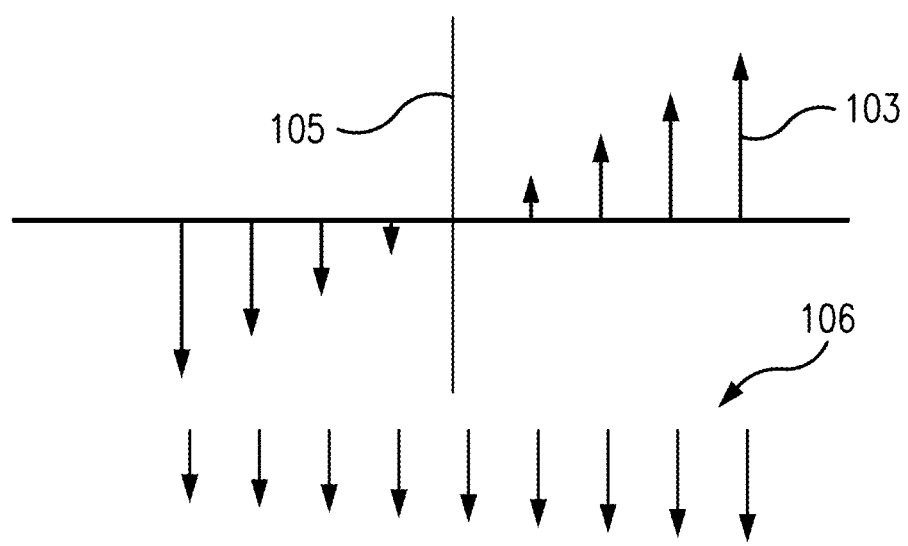
FIG. 12 illustrates an important special case of the transform calculation in the situation where the kernel area includes sensors straddling both "inverted" and "non-inverted" zones of the primary coil. The primary coil field's vertical component is shown undergoing an "inversion", which changes the effect of the foreign object field on the primary magnetic field, the same foreign object generated field increases the total field on one side of the inversion line, but decreases it on the other side, in accordance with an example embodiment of the invention.

FIG. 12 illustrates an important special case of the transform calculation in the situation where the kernel area includes sensors straddling both "inverted" and "non-inverted" zones of the primary coil. The primary coil field's vertical component 103 is shown undergoing an "inversion" 105, which changes the effect of the foreign object field 106 on the primary magnetic field 103, the same foreign object generated field 106 increases the total or combined field on one side of the inversion line 105, but decreases it on the other side, in accordance with an example embodiment of the invention.

In accordance with an example embodiment of the invention, a method may be employed for detecting foreign objects near a primary coil of an induction charger. The method may include the step of sensing, by each of a plurality of sensors in a sensor array covering at least a portion of the primary coil, a high frequency alternating magnetic field produced by the primary coil, the magnetic field produced by the primary coil having a spatial distribution of magnetic intensity that varies by location across the primary coil area, each sensor of the array being configured to have a magnetic field sensing sensitivity that is inversely proportional to the magnetic intensity of the magnetic field produced by the primary coil at a location of the sensor with respect to the primary coil area.

The method may further include scanning, by a controller coupled to the sensor array, sensor signals output by the plurality of sensors in the sensor array, in response to the sensors magnetically coupling the high frequency alternating magnetic field produced by the primary coil.

The method may further include determining, by the controller coupled to the sensor array, whether there is at least one sensor in the sensor array that is outputting a sensor signal indicating presence of a foreign object proximate to the sensor, which is perturbing the high frequency alternating magnetic field near the sensor.

The method may further include sensing with a reference sensor coil located in the primary coil area, a time-varying magnetic intensity of the magnetic field produced by the primary coil, to compensate for the time-varying magnetic intensity in the determination of which sensors in the array are outputting a sensing signal indicating the presence of the foreign object proximate to the sensors.

The method may further include computing a two-dimensional convolution transform on the sensing signals received from the sensors in the array, the two-dimensional convolution transform being configured to detect sharp changes of two dimensional images of magnetic intensity produced by a combination of the primary coil and the foreign object, the sharp changes indicating the presence of the foreign object proximate to the sensors.

Although specific example embodiments of the invention have been disclosed, persons of skill in the art will appreciate that changes can be made to the details described for the specific example embodiments, without departing from the spirit and the scope of the invention.

What is claimed is:

1. A device for detecting foreign objects near a primary coil of an induction charger, comprising:
a sensor array located adjacent to the primary coil of the induction charger, the array covering at least a portion of the primary coil area, and containing sensors, each sensor configured to output a sensing signal in response to magnetically coupling a high frequency alternating magnetic field produced by the primary coil, the magnetic field produced by the primary coil having a spatial distribution of magnetic intensity that varies by location across the primary coil area, each sensor of the array being configured to have a magnetic field sensing sensitivity that is inversely proportional to the magnetic intensity of the magnetic field produced by the primary coil at a location of the sensor with respect to the primary coil area; and
a controller coupled to the sensors, the controller configured to scan the sensing signal of each sensor in the array, compute a two-dimensional convolution transform on the received sensing signals, the two-dimensional convolution transform being configured to detect sharp changes of two dimensional images of magnetic intensity produced by a combination of the primary coil and the foreign object, the sharp changes indicating the presence of the foreign object proximate to the sensors and compute a modified two-dimensional convolution transform on the sensing signals received from the sensors in the array, where the sensors in the array are juxtaposed with a magnetic intensity produced by the primary coil, which undergoes an inversion that changes a direction of the magnetic intensity produced by the primary coil thereby determining from the scanned sensing signals, which sensors in the array are outputting a sensing signal indicating presence of the foreign object proximate to the sensors, the foreign object causing a perturbation in the high frequency alternating magnetic field near the sensors.

2. The device for detecting foreign objects near a primary coil of an induction charger of claim 1, wherein each sensor of the array has a coil area configured to have a magnetic field sensing sensitivity that is inversely proportional to the magnetic intensity of the magnetic field produced by the primary coil at a location of the sensor with respect to the primary coil area.

3. The device for detecting foreign objects near a primary coil of an induction charger of claim 1, wherein each sensor of the array has a number of turns of a sensor coil configured to have a magnetic field sensing sensitivity that is inversely proportional to the magnetic intensity of the magnetic field produced by the primary coil at a location of the sensor with respect to the primary coil area.

4. The device for detecting foreign objects near a primary coil of an induction charger of claim 1, wherein a reference sensor coil is located in or immediately adjacent to the primary coil area, the reference sensor coil having an output connected to the controller, the reference sensor coil being configured to output a reference sensing signal characterizing a time-varying magnetic intensity of the magnetic field produced by the primary coil, the controller being configured to compensate for the time-varying magnetic intensity in the determination of which sensors in the array are outputting a sensing signal indicating the presence of the foreign object proximate to the sensors.

5. The device for detecting foreign objects near a primary coil of an induction charger of claim 1, wherein each sensor of the array is configured to have a magnetic field sensing sensitivity that is inversely proportional to the magnetic intensity of the magnetic field produced by the primary coil at a location of the sensor with respect to the primary coil area, by adjusting an area of a coil of the sensor and a number of turns of the sensor coil.

6. The device for detecting foreign objects near a primary coil of an induction charger of claim 4, wherein the reference sensing coil is a sensor of the sensor array.

7. The device for detecting foreign objects near a primary coil of an induction charger of claim 4, wherein the reference sensing coil is a coil located immediately adjacent to a periphery of the primary coil.

8. A method for detecting foreign objects near a primary coil of an induction charger, comprising:

sensing, by each of a plurality of sensors in a sensor array covering at least a portion of the primary coil, a high frequency alternating magnetic field produced by the primary coil, the magnetic field produced by the primary coil having a spatial distribution of magnetic intensity that varies by location across the primary coil area, each sensor of the array being configured to have a magnetic field sensing sensitivity that is inversely proportional to the magnetic intensity of the magnetic field produced by the primary coil at a location of the sensor with respect to the primary coil area;

scanning, by a controller coupled to the sensor array, sensor signals output by the plurality of sensors in the sensor array, in response to the sensors magnetically coupling the high frequency alternating magnetic field produced by the primary coil;

computing a two-dimensional convolution transform on the sensing signals received from the sensors in the array, the two-dimensional convolution transform being configured to detect sharp changes of two dimensional images of magnetic intensity produced by a combination of the primary coil and the foreign object, the sharp changes indicating the presence of the foreign object proximate to the sensors:

computing a modified two-dimensional convolution transform on the sensing signals received from the sensors in the array, where the sensors in the array are juxtaposed with a magnetic intensity produced by the primary coil, which undergoes an inversion that changes a direction of the magnetic intensity produced by the primary coil; and determining, by the controller coupled to the sensor array, whether there is at least one sensor in the sensor array that is outputting a sensor signal indicating presence of a foreign object proximate to the sensor, which is perturbing the high frequency alternating magnetic field near the sensor.

9. The method for detecting foreign objects near a primary coil of an induction charger, of claim 8, wherein each sensor of the array has a coil area configured to have a magnetic field sensing sensitivity that is inversely proportional to the magnetic intensity of the magnetic field produced by the primary coil at a location of the sensor with respect to the primary coil area.

10. The method for detecting foreign objects near a primary coil of an induction charger, of claim 8, wherein each sensor of the array has a number of turns of a sensor coil configured to have a magnetic field sensing sensitivity that is inversely proportional to the magnetic intensity of the magnetic field produced by the primary coil at a location of the sensor with respect to the primary coil area.

11. The method for detecting foreign objects near a primary coil of an induction charger, of claim 8, further comprising:

sensing with a reference sensor coil located in or immediately adjacent to the primary coil area, a time-varying magnetic intensity of the magnetic field produced by the primary coil, to compensate for the time-varying magnetic intensity in the determination of which sensors in the array are outputting a sensing signal indicating the presence of the foreign object proximate to the sensors.

12. The method for detecting foreign objects near a primary coil of an induction charger of claim 8, wherein each sensor of the array is configured to have a magnetic field sensing sensitivity that is inversely proportional to the magnetic intensity of the magnetic field produced by the primary coil at a location of the sensor with respect to the primary coil area, by adjusting an area of a coil of the sensor and a number of turns of the sensor coil.

13. The method for detecting foreign objects near a primary coil of an induction charger of claim 11, wherein the reference sensing coil is a sensor of the sensor array.

14. The method for detecting foreign objects near a primary coil of an induction charger of claim 11, wherein the reference sensing coil is a coil located immediately adjacent a periphery of the primary coil.

* * * * *